United States Patent [19]

Blaha

[11] 4,227,704
[45] Oct. 14, 1980

[54] SEAL

[75] Inventor: James G. Blaha, Painesville, Ohio

[73] Assignee: Towmotor Corporation, Mentor, Ohio

[21] Appl. No.: 110,282

[22] Filed: Jan. 7, 1980

Related U.S. Application Data

[63] Continuation-in-part of Ser. No. 12,162, Jan. 18, 1979.

[51] Int. Cl.³ .......................... F16J 15/32; F16J 15/34
[52] U.S. Cl. ........................................ 277/84; 277/85; 277/95; 277/189; 308/187.1; 188/18 R
[58] Field of Search .......................... 277/38, 39, 43, 48, 277/53, 81 R, 84, 85, 88, 92, 95, 152, 153, 165, 186, 189, 205, 206 R; 308/36.1, 187.1, 187.2; 305/11; 188/18 R

[56] References Cited

U.S. PATENT DOCUMENTS

| | | | |
|---|---|---|---|
| 3,006,701 | 10/1961 | Curtis | 308/187.1 |
| 3,438,639 | 4/1969 | Paulsen | 308/187.1 X |
| 3,447,848 | 6/1969 | Pitner | 308/187.2 |
| 3,533,491 | 10/1970 | Svenson | 188/18 R |
| 3,614,113 | 10/1971 | Burk | 305/11 X |
| 3,614,183 | 10/1971 | Berens et al. | 308/187.1 |
| 3,841,723 | 10/1974 | Kelso | 308/187.1 |
| 3,998,297 | 12/1976 | Aono | 188/18 R |
| 4,021,085 | 5/1977 | Willyard | 308/187.2 |
| 4,058,322 | 11/1977 | Fass | 277/96.1 |

FOREIGN PATENT DOCUMENTS

| | | | |
|---|---|---|---|
| 1003674 | 3/1957 | Fed. Rep. of Germany | 277/189 |
| 1139430 | 2/1957 | France | 308/187.1 |
| 1424192 | 2/1976 | United Kingdom | 188/18 R |

Primary Examiner—Robert S. Ward, Jr.
Attorney, Agent, or Firm—William B. Heming

[57] ABSTRACT

A seal (16) is positioned to prevent entry of foreign matter through an annular opening (26) between first and second members (12,14). The first and second members (12,14) are, for example, a stationary backing plate (20) and a rotatable hub (22) of a brake assembly (24) or a rotatable shaft and associated housing element. Foreign matter passing between the backing plate (20) and the hub (22), for example, can enter an associated brake drum (30) and interfere with effectiveness of the brake assembly (24). Apparatus (67) connects the seal (16) to the backing plate (20). The seal (16) has first and second legs (38,40) each having a sealing surface (58,60). The sealing surfaces contact a face (94) and outer surface (92) of the hub (22), respectively, to substantially block passage of foreign matter to the brake drum (30).

20 Claims, 3 Drawing Figures

SEAL

CROSS REFERENCE TO RELATED APPLICATIONS

This application is a continuation-in-part of application Ser. No. 012,162 filed by James G. Blaha on Jan. 18, 1979.

TECHNICAL FIELD

The invention relates to a seal which can be positioned at a location sufficient for sealing an annular opening between first and second members rotatable one relative to the other. More particularly, the invention relates to a seal having first and second legs each having a sealing surface in contact with a respective one of a face and an outer surface of the second member.

BACKGROUND ART

In the use of first and second members rotatable one relative to the other, it is desirable to seal an annular opening between the members to prevent passage of foreign matter through said annular opening. According to the present invention, a seal is used to block passage of foreign matter between the first and second member.

U.S. Pat. No. 3,998,297 which issued on Dec. 21, 1976, to Aono shows a brake assembly having a backing plate and cover plate connected thereto which form a labyrinth barrier to material passing between the backing plate and an associated brake drum. U.S. Pat. Nos. 3,533,491 and 3,463,273 which issued to Svenson & Morrison on Oct. 13, 1970, and Aug. 26, 1969, respectively, show similar embodiments of barriers on brake assemblies.

U.S. Pat. No. 3,438,639 which issued on Apr. 15, 1969, to Paulsen shows embodiments of packing devices for rotating shafts which utilize elastomeric seals to seal annular openings between a shaft and bearing and support housing. U.S. Pat. No. 4,043,620 which issued to Otto on Aug. 23, 1977, shows embodiments of seals similarly used. U.S. Pat. No. 3,687,464 which issued on Aug. 29, 1972, to Jackson et al shows an embodiment of a seal used between surfaces of a shaft and related perpendicular abutment.

For example, in a lift truck, a brake assembly generally has a backing plate connected to an axle housing. A wheel of the lift truck mounts to a hub which is rotatably connected to an axle tube. The hub includes a brake drum portion. Brake shoes controllably ride against the brake drum portion to slow or stop rotation of the wheel relative to the axle tube. The backing plate is provided to prevent foreign matter from entering the drum which can interfere with the operation of brake shoes against the rotating hub. However, because of relative rotation between the backing plate and hub, an "annular opening" is necessarily maintained between the hub and backing plate. During operation of the vehicle, dirt, rock, or water for example, can enter through the annular opening and interfere with brake operation.

Heretofore, metal plates have been connected to one of the backing plate and hub and angularly extended over the other of said members to form a baffle or labyrinth against entry of the foreign matter. This type of solution, however, does not create a positive seal between the two surfaces and dirt and water can still enter the brake assembly, especially in the harsh environment of a work vehicle such as a lift truck.

The present invention is directed to overcoming one or more of the problems as set forth above.

DISCLOSURE OF INVENTION

In one aspect of the present invention, a seal has a body and first and second legs. The first leg has a sealing surface and is connected to the body and extends outwardly from a first side of the body. The second leg has a sealing surface and is connected to the body and extends outwardly from the first side of the body. Means, such as a fastening element, is provided for fastening the seal in a preselected position.

The seal is used between first and second members which are, for example, a backing plate and hub of a braking assembly, respectively. During rotation of the hub for driving an associated work vehicle, foreign matter can pass between the hub and backing plate and interfere with operation of brake shoes and a brake drum located within the hub. The seal is connected to the backing plate and the sealing surfaces of the first and second legs slideably contact the hub to seal an opening between the hub and backing plate for substantially blocking entry of interfering foreign matter to the brake drum.

BEST MODE FOR CARRYING OUT THE INVENTION

Figure 1:
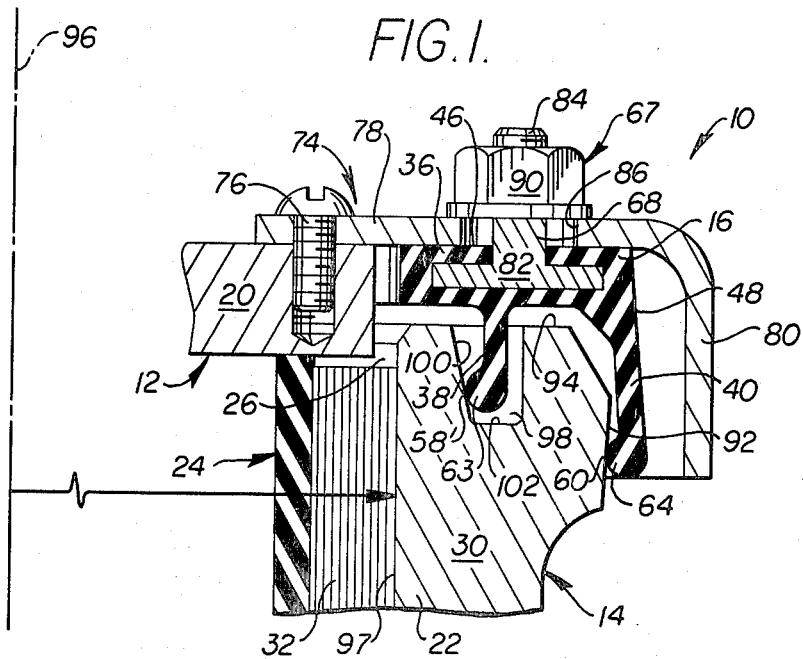
FIG. 1 is a diagrammatic cross-sectional view of an embodiment of a seal of the present invention installed on a brake assembly.

Referring to FIG. 1, a seal assembly 10 includes first and second members 12,14 and a seal 16. The first and second members 12,14 are shown, for example, as a backing plate 20 and a hub 22 of a brake assembly 24, respectively. The hub 22 and backing plate 20 are rotatable one relative to the other and define an annular opening 26 between the hub 22 and the backing plate 20.

As shown, the hub 22 rotates relative to the backing plate 20. The backing plate 20 is connected to an axle tube which is fixed to an associated work vehicle (not shown). The hub 22 includes a brake drum portion 30 against which brake shoes 32 are controllably operable to slow or stop rotation of the hub 22 relative to the backing plate 20. Support means, such as a bearing (not shown) positioned between the hub 22 and the axle tube, supports the hub 22 and backing plate 20 in rotation one relative to the other. Such brake assembly construction is well known in the art. The seal 16, as hereafter described, is positioned at a location sufficient for blocking passage of foreign matter through the annular opening 26 to maintain satisfactory operation of the brake assembly 24.

Figure 2:
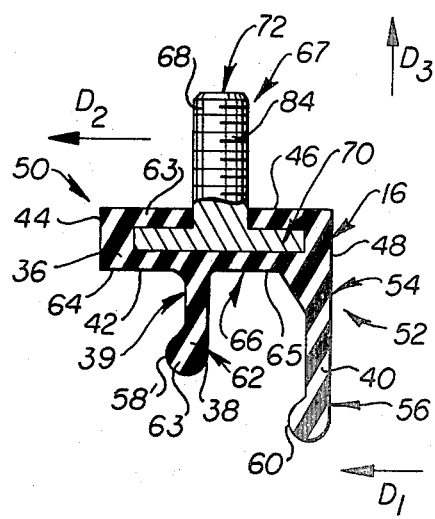
FIG. 2 is a diagrammatic enlarged cross-sectional view of the seal of FIG. 1 showing the seal removed from the brake assembly.
Figure 3:
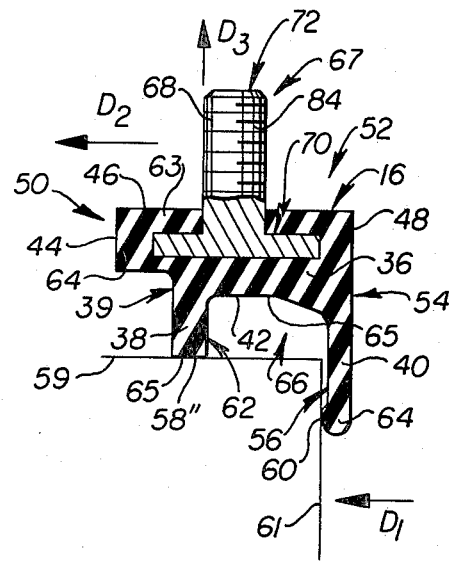
FIG. 3 is a diagrammatic cross-sectional view of another embodiment of a seal of the present invention.

Referring particularly to FIGS. 2 and 3, the seal 16 has a body 36 and first and second legs 38,40. The body 36 has first, second, third and fourth sides 42,44,46,48 and first and second end portions 50,52. The first and third sides 42,46 are oriented generally opposite one from the other and the second side 44 extends between said first and third sides 42,46. The first leg 38 is connected at a first end portion 39 to the first end portion 50 of the body 36 and extends outwardly from said first side 42. The second leg 40 has first and second end portions 54,56 and is connected at the first end portion 54 to the second end portion 52 of the body 36. Said leg 40 extends outwardly from the first side 42, preferably generally parallel to said first leg 38. It is also desirable that said first and second legs 38,40 extend outwardly generally perpendicular from the first side 42 and that said second leg 40 extend a greater distance outwardly from said first side 42 than said first leg 38 extends from the first side 42. The body 36 and legs 38,40 are preferably of unitary, elastomeric construction.

Each of the seal legs 38,40 has a sealing surface 58,60 which is contactable with the hub 22 in the installed position of the seal 16 in order to "seal" against said hub 22. The sealing surface 58 of the first leg 38 is positioned on a second end portion 62 of said leg 38. The sealing surface 60 of the second leg 40 is also positioned on the second end portion 56 of the leg 40. Preferably, said second end portions 62,56 each have a lip 63,64 extending generally inwardly from their respective related second end portions 62,56 in a direction $D_1$, toward the first end portion 50 of the body 36 (FIGS. 1 and 2). Thus, the sealing surface 58', 60 are positioned on the lips 63,64, respectively. In the embodiment of FIG. 3, the sealing surface 58" of the first leg 38 is positioned on or defined by a first end 65 of said first leg 38 and the sealing surfaces 58,60 are oriented generally perpendicularly one relative to the other. In other words, planes 59,61 defined by said sealing surfaces 58,60, respectively, intersect at generally right angles.

On the seal 16, an arm portion 63 of the body 36 extends at substantially right angles to the first leg 38 in a direction $D_2$ from said first and second legs 38,40. The arm portion 63 defines the second side 44 of the body 36, which is oriented generally parallel to the first leg 38, and a first portion 64 of the first side 42 of the body 36. The first and second legs extend outwardly from the first side 42 of the body 36 to define a generally U-shaped opening 66 with the body 36 of said seal 16. A second portion 65 of the first side 42 extends angularly from and relative to said second leg 40 to form an angle $A_1$ with a side 88 of the second leg 40. As is shown, the second portion 65 extends angularly from said second leg 40 to a point about midway between the first and second legs 38,40 and generally perpendicularly to said first and second legs 38,40 from said midway point to the first leg 38.

Locating means 67, hereinafter described, is provided for sealably fastening or connecting the seal in a preselected position in the seal assembly 10. The locating means 67 includes fastening element 68 having first and second portions 70,72 and a mounting element 74 (FIG. 1) removably connectable to said fastening element 68 and the backing plate 20. The fastening element 68 is oriented generally opposite of the outward extension of the first and second legs 38,40 from the body 36 and extends outwardly from the third side 46 of the body 36. Thus, the fastening element 68 extends in a direction $D_3$ away from said first and second legs 38,40.

In the seal assembly 10, said mounting element 74 is positioned about and connected to the backing plate 20 by cap screws, rivets 76 or the like to act as a shield preventing entry of foreign matter between the seal 16 and the backing plate 20 and protecting the seal 16 from damage. First and second shield portions 78,80 of said mounting element 68 protect the third side 46 of the body 36, and the fourth side 48 of the body 36 and the second leg 40, respectively.

The first portion 70 of the fastening element 68 is connected to the body 36 of the seal 16. Preferably, said first portion 70 is an annular ring 82 positioned in or molded into and positioned along said body 36. The second portion 72 of the fastening element 68, shown as a plurality of flanges 84, extends outwardly from the third side 46 of the body 36 and is removably connected to the mounting element 74. The flanges 84 each extend through one of a plurality of openings 86 in the mounting element 74. A plurality of nuts 90 each threadably engage one of the flanges 84 to connect the fastening and mounting element 68,74 (FIG. 1). The first portion 70 of the fastening element 68 can also be, for example, individual anchors molded into the body 36 and connected to respective flanges 84.

It should be understood that the seal 16 can be of other configurations as is known in the art without departing from the invention.

INDUSTRIAL APPLICABILITY

In the use of the seal 16 in the seal assembly 10, the hub 22 rotates relative to the backing plate 20. The sealing surfaces 58,60 "seal" against the hub 22 to substantially block entry of foreign material through the annular opening 26 into the brake shoes 32 and drum 30. The seal 16 is preferably of abrasion resistant rubber to withstand the working environment of, for example, a work vehicle (not shown) associated with the brake assembly 24.

Referring particularly to the brake assembly 24, the hub 22 has an outer surface 92, a face 94 and a central axis 96. The outer surface 92 is located or positioned generally along the axis 96 which is the axis of rotation of the rotatable hub 22. The face 94 extends from said outer surface 92 in a direction toward the central axis 96 to an inner surface 97 of the hub 22. It should be understood that the backing plate 20 can be rotatable without departing from the invention. The face 94 of the hub 22 has an annular opening 98 having sidewalls 100 and a bottom surface 102. The first leg 38 of the seal 16 extends into said opening 98 preferably at a location spaced from the sidewalls 100 of said opening 98.

The sealing surfaces 58,60 of the first and second legs 38,40 are in sealing, slidable contact with the face 94 and outer surface 92 of the hub 22, respectively. The sealing surface 60 of the second leg 40 contacts said hub 22 radially relative to the central axis 70 at the outer surface 92. The sealing surface 58' in the embodiment of FIGS. 1 and 2 also radially contacts the face 94 at the sidewalls 100 of the annular opening 98. In other words, a line passing substantially perpendicularly through either of the sealing surfaces 58',60 is also substantially perpendicular to said central axis 96 (FIG. 1). In the embodiment of FIG. 3, the sealing surface 58" of the first leg 38, when in position, slidably contacts the face 68 of the hub 22 at the bottom surface 102 of said annular opening 98. Thus, the first leg 44 forms a labyrinth type seal relative to said hub 22 when the seal 16 is installed.

The seal 16 tends to accommodate eccentricity of the rotating hub 22 relative to the backing plate 20 owing to the flexibility of the second leg 40 and the spaced relationship of the first leg 38 and the sidewalls 78 of the annular opening 76. Where the sealing surfaces 58,60 urge against the face 68 and outer surface 66 respectively, the seal 16 will gradually seat against the hub 22, particularly with respect to the sealing surface 58" of the first leg 38 in FIG. 3. Also, wear of that sealing surface 58" of the first leg 38 tends to move the second leg 40 along the outer surface 66 of the hub 22 to maintain the seal along said outer surface 66.

Other aspects, objects and advantages will become apparent from a study of the specification, drawings and appended claims.

I claim:

1. A seal (16), comprising:
    a body (36) having a first and second end portions (50,52) and first, second and third sides (42,44,46), said first and third sides (42,46) being oriented generally opposite one from the other, said second side (44) extending between said first and third sides (42,46);
    a first leg (38) having a sealing surface (58) and being connected to said first end portion (50) of the body (36) and extending outwardly from said first side (42) of said body (36);
    a second leg (40) having a sealing surface (60) and being connected to said second end portion (52) of said body (36) and extending outwardly from said first side (42) of said body (36); and
    a fastening element (68) connected to said body (36) and being oriented opposite of said outward extension of said first and second legs (38,40) from said body (36) and extending outwardly from said third side (46) of said body (36).

2. The seal (16), as set forth in claim 1, wherein said first and second legs (38,40) extend outwardly from said first side (42) of said body (36) generally parallel one to the other.

3. The seal (16), as set forth in claim 1, wherein said second leg (40) extends from said first side (42) of said body (36) a greater distance than said first leg (38) extends from said first side (42) of said body (36).

4. The seal (16), as set forth in claim 1, wherein said first leg (38) extends outwardly generally perpendicularly from said first side (42) of said body (36).

5. The seal (16), as set forth in claim 1, wherein said second leg (40) extends outwardly generally perpendicularly from said first side (42) of said body (36).

6. The seal (16), as set forth in claim 1, wherein said first and second legs (38,40) and said body (36) of said seal (16) are of unitary, elastomeric construction.

7. The seal (16), as set forth in claim 1, wherein said seal (16) is annular in configuration.

8. The seal (16), as set forth in claim 1, wherein said first and second legs (38,40) define a generally U-shaped opening (66) with said body (36) of said seal (16).

9. The seal (16), as set forth in claim 1, wherein said second leg (40) has first and second end portions (54,56), said first end portion (54) being connected to said second end portion (52) of said body (36), said second end portion (56) having a lip (64), said lip (64) having said sealing surface (60) and extending generally inwardly from said second end portion (56) in a direction ($D_1$) toward said first end portion (50) of said body (36).

10. The seal (16), as set forth in claim 1, wherein said first side (42) of said body (36) has a portion (65) extending between said first and second legs (38,40) and angularly from and relative to said second leg (40).

11. The seal (16), as set forth in claim 10, wherein said first side portion (65) extends angularly from said second leg (40) to a point about midway between said first and second legs (38,40) and generally perpendicular to said first and second legs (38,40) from said midway point to said first leg (38).

12. The seal (16), as set forth in claim 1, wherein said first end portion (54) of said body (36) has an arm portion (63) extending at substantially right angles to the first leg (38) in a direction ($D_2$) from said first and second legs (38,40) and defining a second side (44) of said body (36) oriented generally parallel to said first leg (38).

13. The seal (16), as set forth in claim 1, wherein said fastening element (68) has first and second portions (70,72), said first portion (70) being connected to said body (36), said second portion (72) extending outwardly from said third side (46) of said body (36).

14. The seal (16), as set forth in claim 13, wherein said first portion (70) is an annular ring positioned in said body (36) of the seal (16).

15. The seal (16), as set forth in claim 13, wherein said second portion (72) of the fastening element (68) includes a plurality of flanges (84).

16. The seal (16), as set forth in claim 1, wherein said sealing surfaces (58,60) of said first and second legs (38,40) are oriented generally perpendicular one relative to the other.

17. The seal (16), as set forth in claim 1, wherein said first leg (38) has first and second end portions (39,62), said first end portion (39) being connected to said first end portion (50) of said body (36), said second end portion (62) having a lip (63) having said sealing surface (58') of said first leg (38).

18. The seal (16), as set forth in claim 17, wherein said lip (63) extends generally inwardly from said second end portion (62) in a direction ($D_1$) toward said first end portion (58) of said body (36).

19. The seal (16), as set forth in claim 1, wherein said first leg (38) has an end (65) and said sealing surface (58") of said first leg (38) is defined by said end (65).

20. A seal (16), comprising:
    a body (36) having first and second end portions (50,52) and first, second and third sides (42,44,46), said first and third sides (42,46) being oriented generally opposite one another, said second side (44) extending between said first and third sides (42,46);
    a first leg (38) having a sealing surface (58) and being connected to said first end portion (50) of said body (36) and extending outwardly from and generally perpendicular to said first side (42) of said body (36);
    a second leg (40) having first and second end portions (54,56) and being connected at said first end portion (54) to said second end portion (52) of said body (36), and extending outwardly from and generally perpendicular to said first side (42) of said body (36), said second end portion (56) of said second leg (40) having a lip (64), said lip (64) having a sealing surface (60) and extending generally inwardly from said second end portion (56) in a direction ($D_1$) toward said first end portion (50) of said body (36); and
    locating means (67) for fastening said seal (16) in a preselected position, said means (67) being oriented opposite of said first and second legs (38,40) and extending in a direction ($D_3$) away from said first and second legs (38,40).

* * * * *

Disclaimer 4,227,704.—*James G. Blaha*, Painesville, Ohio. SEAL. Patent dated Oct. 14, 1980. Disclaimer filed Dec. 17, 1984, by the assignee, *Towmotor Corp.*

Hereby enters this disclaimer to claims 1 through 20 of said patent.

[*Official Gazette February 12, 1985.*]